(12) United States Patent
Kraus et al.

(10) Patent No.: US 9,585,311 B2
(45) Date of Patent: Mar. 7, 2017

(54) CLUTCH MECHANISM FOR A BALER

(71) Applicant: Deere & Company, Moline, IL (US)

(72) Inventors: Timothy J. Kraus, Blakesburg, IA (US); Carl F. DeMulder, Ottumwa, IA (US); Alan Lugert, Ottumwa, IA (US)

(73) Assignee: Deere & Company, Moline, IL (US)

( * ) Notice: Subject to any disclaimer, the term of this patent is extended or adjusted under 35 U.S.C. 154(b) by 179 days.

(21) Appl. No.: 14/494,188

(22) Filed: Sep. 23, 2014

(65) Prior Publication Data

US 2016/0081277 A1    Mar. 24, 2016

(51) Int. Cl.
| | | |
|---|---|---|
| A01F 15/08 | (2006.01) | |
| F16D 23/12 | (2006.01) | |
| A01F 15/14 | (2006.01) | |
| A01D 59/04 | (2006.01) | |

(52) U.S. Cl.
CPC .......... *A01F 15/0858* (2013.01); *F16D 23/12* (2013.01); *A01D 59/04* (2013.01); *A01F 15/145* (2013.01); *A01F 2015/0866* (2013.01); *F16D 2023/126* (2013.01)

(58) Field of Classification Search
CPC .................. A01F 15/0858; A01F 2015/0866
See application file for complete search history.

(56) References Cited

U.S. PATENT DOCUMENTS

| | | | | |
|---|---|---|---|---|
| 2,701,517 A | * | 2/1955 | Hauswirth | .......... A01F 15/0858 |
| | | | | 100/4 |
| 2,807,996 A | * | 10/1957 | Barnes | ................ A01F 15/0858 |
| | | | | 100/4 |
| 5,782,175 A | | 7/1998 | Schrag | |
| 6,394,245 B2 | | 5/2002 | Kendrick et al. | |
| 2009/0139823 A1 | * | 6/2009 | Dyer | ...................... F16D 23/12 |
| | | | | 192/114 R |

FOREIGN PATENT DOCUMENTS

| | | |
|---|---|---|
| EP | 03883986 | 12/1998 |
| EP | 1131993 | 9/2001 |

OTHER PUBLICATIONS

John Deere, "100 Intermediate Square Baler," technical manual, dated Feb. 27, 2001, pp. PN340-PN400, TM1690, USA.
EP15181904.2 European Search Report and Written Opinion dated Feb. 23, 2016 (8 pages).

* cited by examiner

*Primary Examiner* — Jacob S Scott
*Assistant Examiner* — Timothy M Hannon
(74) *Attorney, Agent, or Firm* — Michael Best & Friedrich LLP (57) ABSTRACT

A clutch for selectively driving a mechanism. The clutch includes an engagement member movable between an engaged position for driving the mechanism and a disengaged position. The clutch also includes an actuation assembly having a first member pivotable about a pivot and cooperative with a control element for movement between a retaining position and a release position, and a second member pivotable about the pivot between the retaining position and the release position. The second member extends towards the engagement member in the retaining position for maintaining the engagement member in the disengaged position. The second member is pivotable about the pivot independently of the first member such that the second member is rotatable relative to the first member.

20 Claims, 12 Drawing Sheets

CLUTCH MECHANISM FOR A BALER

BACKGROUND

The present disclosure relates to a clutch mechanism for a machine, such as a hay baler.

More specifically, the present disclosure relates to the clutch mechanism that activates the knotter and twine needles in a baler, such as a square baler for baling hay.

SUMMARY

In one aspect, the disclosure provides a clutch for selectively driving a mechanism. The clutch includes an engagement member movable between an engaged position for driving the mechanism and a disengaged position, and an actuation assembly. The actuation assembly includes a first member pivotable about a pivot and cooperative with a control element for movement between a retaining position and a release position, and a second member pivotable about the pivot between the retaining position and the release position. The second member extends towards the engagement member in the retaining position for maintaining the engagement member in the disengaged position. The second member is pivotable about the pivot independently of the first member such that the second member is rotatable relative to the first member.

In another aspect, the disclosure provides a clutch for selectively driving a mechanism, the clutch having a dog movable between an engaged position for driving the mechanism and a disengaged position, and a control movable between a retaining position for holding the dog in the disengaged position and a release position for releasing the dog to the engaged position. The clutch includes an actuation assembly having a pivot, the actuation assembly pivotable about the pivot between the retaining position and the release position in response to the control. The actuation assembly includes a first member pivotable about the pivot between the retaining position and the release position and a second member pivotable about the pivot between the retaining position and the release position. The first member is coupled to the control for being moved between the retaining position and the release position. The second member extends towards the dog in the retaining position for holding the dog in the disengaged position. The second member is coupled to the first member at the pivot such that the first and second members are independently pivotable about the pivot such that the actuation assembly is capable of flexing about the pivot to inhibit binding between the dog and the actuation assembly.

In yet another aspect, the disclosure provides an actuator for engaging and disengaging a clutch mechanism, the clutch mechanism including a clutch engagement member. The actuator includes a first member responsive to a control element for pivotal movement about a pivot point from a first position to a second position, and a second member resiliently couplable to the first member for concurrent pivotal movement with the first member about the pivot point in response to the control element. The second member presents a contact surface and is pivotable relative to the first member about the pivot point in response to interaction between the contact surface and the clutch engagement member.

The disclosure also provides a clutch for selectively driving a mechanism. The clutch includes a driven rotating member having a driving lug positioned on an inner annular surface and having an outer surface, and a dog movable between an engaged position wherein the dog is driven by the driving lug for driving the mechanism and a disengaged position wherein the dog is disengaged from the driving lug. The clutch also includes an actuation assembly having a pivot and movable between a retaining position for holding the dog in the disengaged position and a release position for releasing the dog to the engaged position. The actuation assembly includes a first member pivotable about the pivot between the retaining position and the release position. The first member has a follower configured to selectively follow the outer surface of the rotating member. The actuation assembly also includes a second member pivotable about the pivot between the retaining position and the release position. The second member extends towards the dog in the retaining position for holding the dog in the disengaged position. The second member is coupled to the first member at the pivot such that the first and second members are independently pivotable about the pivot such that the actuation assembly is capable of flexing about the pivot to inhibit binding between the dog and the actuation assembly.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways. Directions such as clockwise and counterclockwise used herein are for illustrative purposes only.

The disclosure relates to a machine 10, such as a baler. In the illustrated construction, the disclosure relates to a square hay baler. In other constructions, the disclosure may relate to other types of balers, such as other extrusion type balers or non-extrusion type balers. In yet other constructions, the disclosure may relate to other types of machines, e.g., vehicles, tractors, other types of agricultural machines, forestry machines, mining machines, construction machines, machines for manufacturing, etc.

Figure 1:
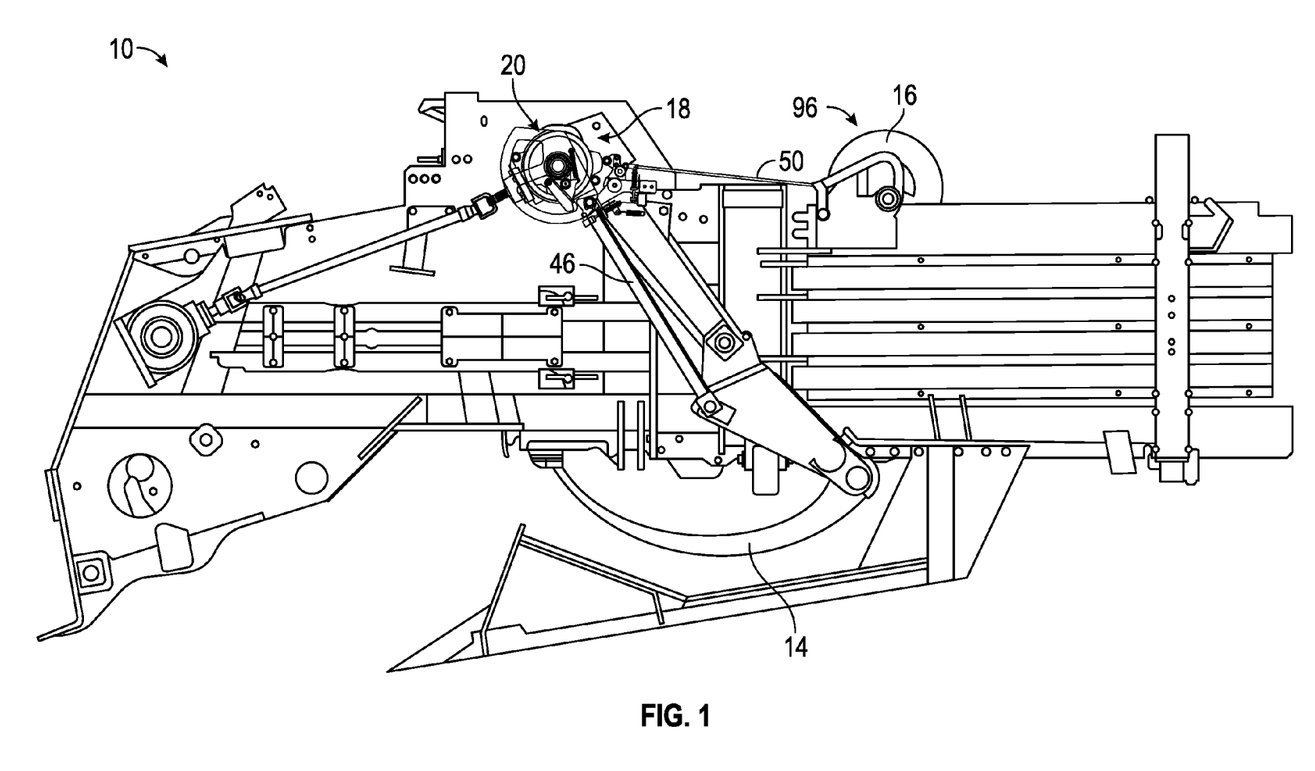
FIG. 1 is a partial cutout side view of a machine, such as a baler, having a clutch in accordance with one implementation of the present disclosure.
Figure 2:
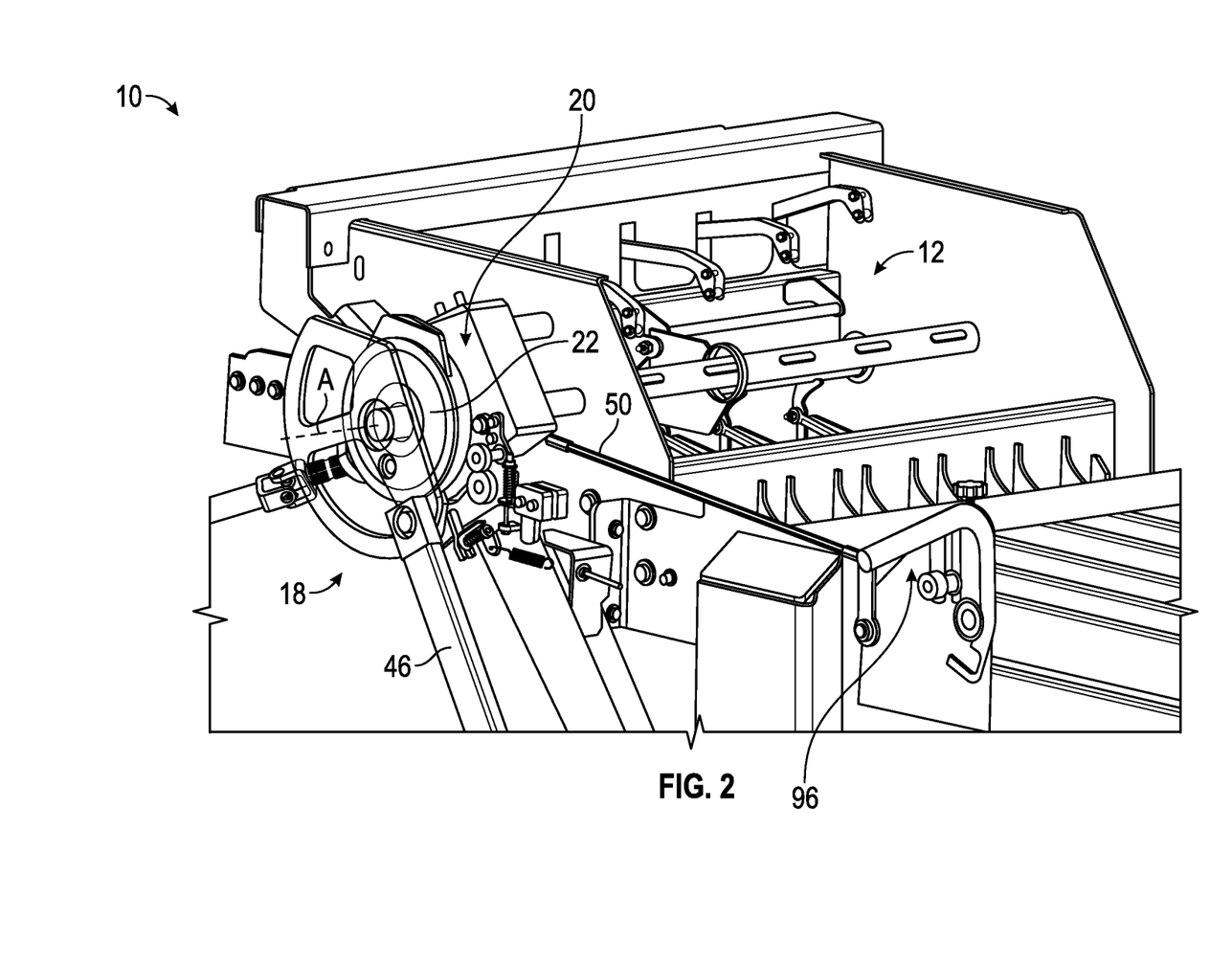
FIG. 2 is a partial cutout perspective view of the machine and clutch of FIG. 1.

Referring to FIGS. 1-2, the baler 10 has a series of knotters 12 at generally the top of the baler 10 which cooperate with twine needles 14 that place strands of twine around a finished bale. Some components of the knotters 12 are not shown in FIG. 2 for simplicity. The knotters 12 form a secure knot in the opposite ends of each twine strand and then cut the twine from the tied bale while retaining the free end of the twine for use in wrapping around the next bale.

A bale length sensor 16, e.g., a star wheel 16, determines when a bale has reached full length, engages a clutch 18 that drivingly couples the knotters 12 with a rotating drive assembly 20, and causes the knotters to actuate for one single revolution. After each single revolution, the clutch 18 is disengaged until the next bale reaches the proper length. During each knotter cycle, the needles 14 swing across a bale chamber located inside the baler 10 to present the ends of twine strands to the knotters 12. In other constructions, the bale length sensor 16 may include other types of mechanical or electronic devices, such as optical sensors, cameras, presence sensors, timers, etc.

The knotters 12 are supplied operating power through the drive assembly 20, such as a chain drive assembly, ultimately from the power takeoff (PTO) of a tractor. In other constructions, the baler 10 may have a dedicated power supply, such as an engine. A drive member 22, which is a component of the drive assembly 20, is constantly driven to rotate about an axis A, so long as power is being supplied to the baler 10. Although the drive member 22 is continuously driven, the knotters 12 are not driven unless the clutch 18 is engaged.

Figure 3:
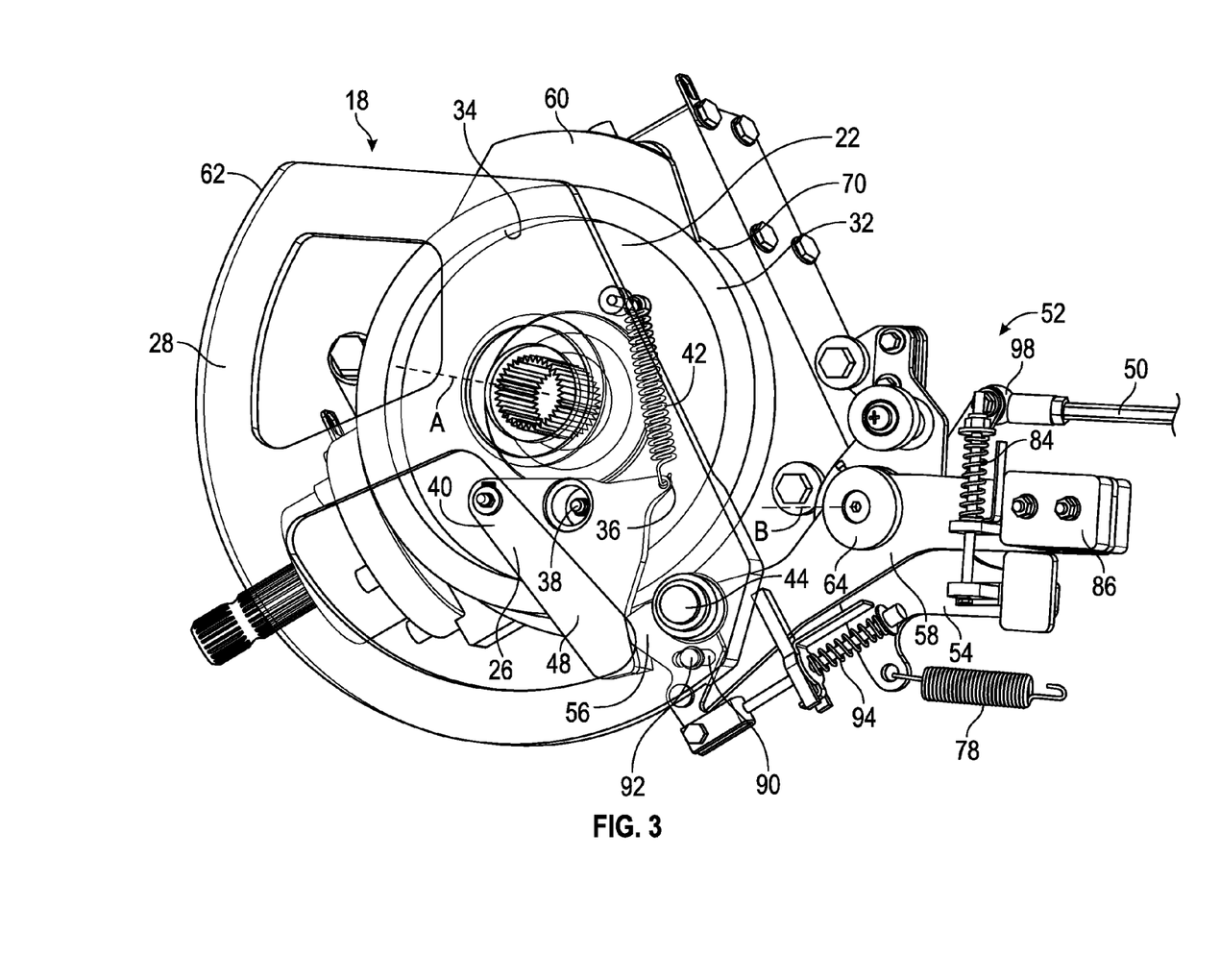
FIG. 3 is a perspective view of the clutch of FIG. 1.
Figure 4:
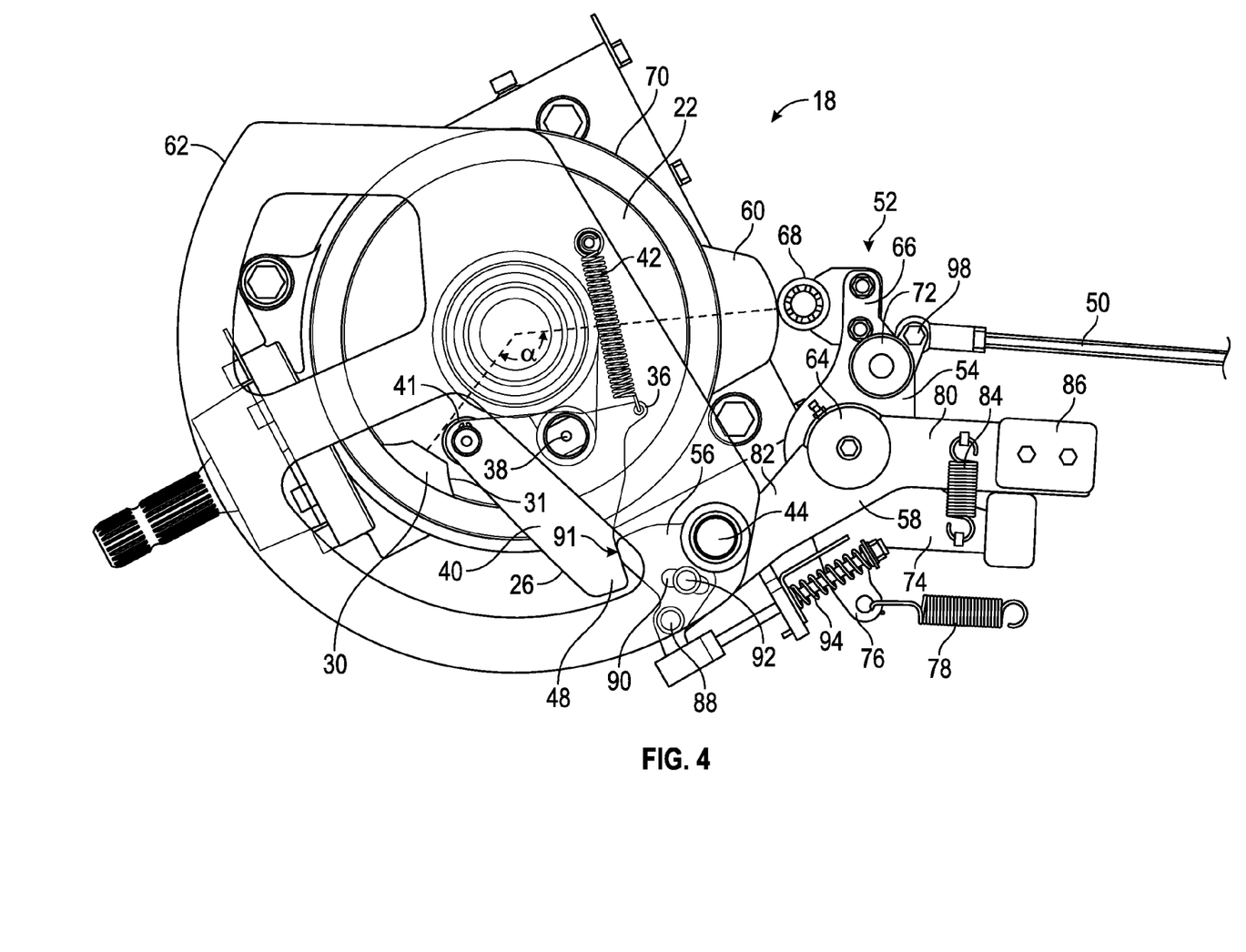
FIGS. 4-10 are side views of the clutch of FIG. 1, shown in various stages of operation.
Figure 10:
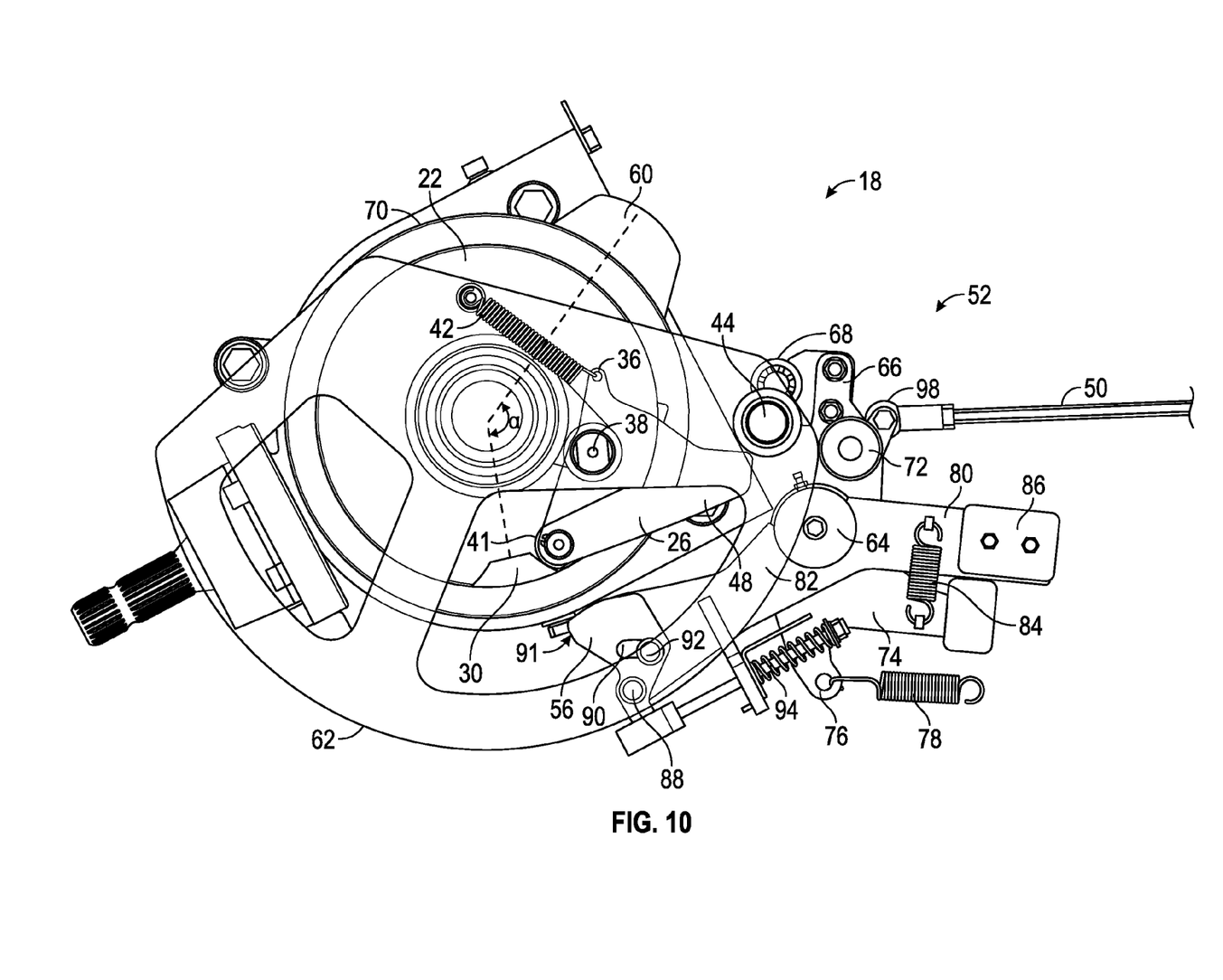

As shown in FIGS. 2-10, the clutch 18 includes a cam ring 32 projecting axially outwardly from an axial outer face of the drive member 22 with respect to axis A. The cam ring 32 has an inner, annular surface 34 substantially concentric about the axis A. A driving lug 30 with a contact surface 31 projects radially inwardly from the surface 34. An external stop 60 extends radially outwardly from an outer annular surface 70 of the cam ring 32 at a fixed angular distance (a) from the driving lug 30 (FIGS. 4 and 10).

The clutch 18 further includes a dog 26 mounted on a clutch member 28. The clutch member 28 presents a reset cam surface 62 disposed generally circumferentially about an outer surface of the clutch member 28 and a needle linkage attachment point 44 operably coupled with a needle linkage 46 (FIGS. 1 and 2) secured to the needles 14.

The dog 26 includes a biasing member attachment point 36, a pivot 38, and an engagement member 40 carrying a follower, such as a roller 41 at a first end and having a retaining portion 48 at a second end. In other constructions, the follower may include a surface or other type of following member. The biasing member attachment point 36, the roller 41, and the retaining portion 48 generally form a substantially triangular-shaped dog 26. The pivot 38 is disposed substantially in line with the engagement member 40 and the biasing member attachment point 36 within the triangular-shaped dog 26; however, in other constructions the pivot point 38 may be outside such that the dog 26 is shaped substantially as a 4-sided polygon.

The dog 26 is coupled to the clutch member 28 at the pivot 38 and is pivotable between an engaged position (FIGS. 5-10) and a disengaged position (FIG. 4). In the engaged position, the engagement member 40 (and more specifically, the roller 41) of the dog 26 rides along the inner annular surface 34 of the cam ring 32 within a substantially circular path of travel of the moving driving lug 30. When the driving lug 30 meets the roller 41, the driving lug 30 is drivingly mated with the dog 26 (FIG. 8) such that the clutch member 28 is engaged for actuating the knotters 12 and twine needles 14. In the disengaged position, the engagement member 40 is lifted radially inward towards the axis A of rotation, creating a clearance so that the driving lug 30 passes under the engagement member 40 without engaging the roller 41 such that the clutch member 28 is disengaged and the knotters 12 and twine needles 14 are not actuated. A biasing member 42 anchored to the clutch member 28 biases the dog 26 to the engaged position. In the illustrated construction, the biasing member 42 includes a spring, such as a coil spring in the form of an extension spring or a compression spring. In other constructions, other types of springs may be employed and in yet other constructions, other types of biasing members may be used, such as elastic members, bands, counter weights, etc.

The clutch 18 is engaged and disengaged by a control 96 that includes the bale length sensor 16 (see FIG. 1). The bale length sensor 16 is coupled to a trip linkage 50, which is in turn coupled to an actuation assembly 52 for holding the dog 26 in the disengaged position against the bias of the biasing member 42 until the bale length sensor 16 trips the actuation assembly 52.

Figure 11:
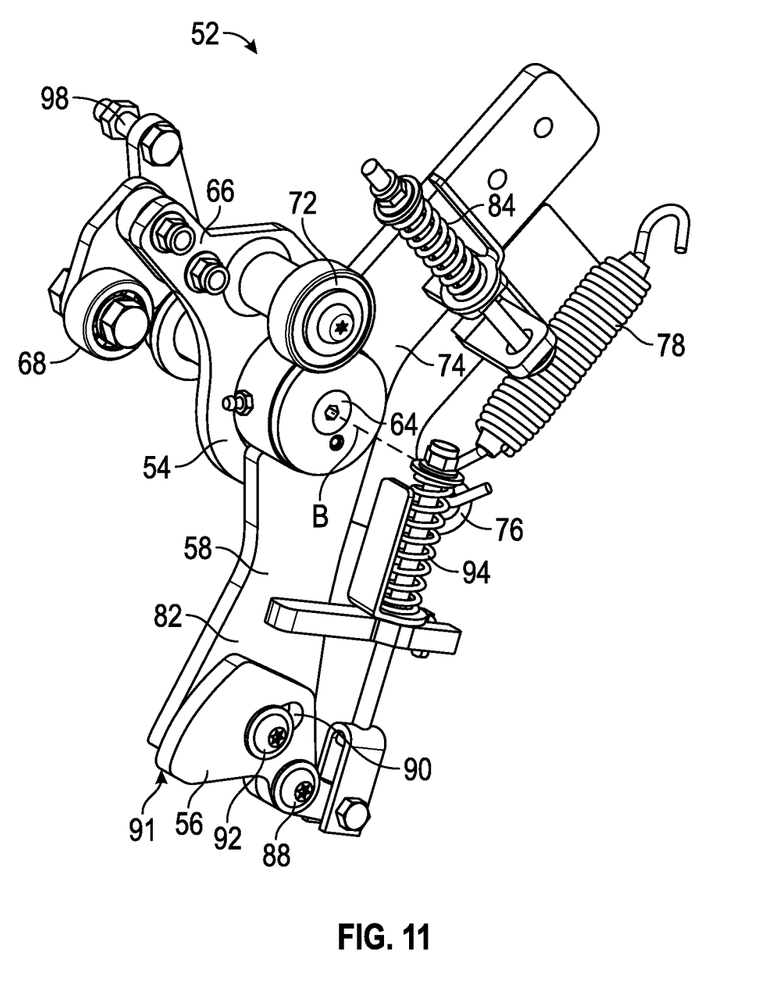
FIG. 11 is a perspective view of an actuation assembly portion of the clutch of FIG. 1.
Figure 12:
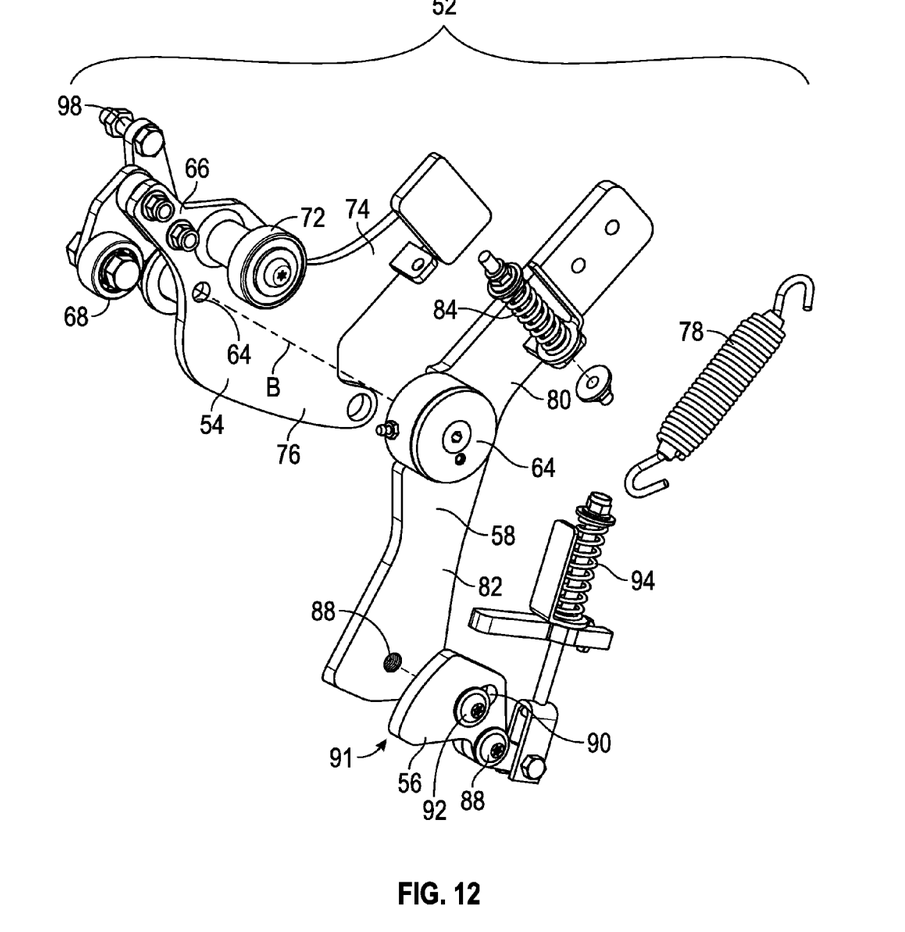
FIG. 12 is an exploded view of the actuation assembly of FIG. 11.

Referring to FIGS. 11-12, the actuation assembly 52 includes a control member 54, a retaining member 56, and a flex member 58 disposed between and linking the control member 54 and the retaining member 56. The control member 54 includes a pivot 64 and a first arm 66 extending generally away from the pivot 64. The first arm 66 has a stop follower, such as a stop roller 68, for timing the movement of the dog 26 into the engaged position relative to the driving lug 30, as will be described in greater detail below. With reference to FIGS. 2-3, the stop roller 68 and the outer surface 70 of the cam ring 32 are disposed substantially in the same plane substantially normal to the axis A. The first arm 66 also includes a reset follower, such as a reset roller 72, for returning the clutch 18 to the disengaged position. With reference to FIGS. 2-3, the reset roller 72 and the reset cam surface 62 of the clutch member 28 are disposed in substantially the same plane substantially normal to the axis A. In other constructions, other types of followers may be employed. The first arm 66 also includes a control attachment point 98 at which the actuation assembly 52 is attached to the control 96. Specifically, the control attachment point 98 is coupled to the trip linkage 50. A second arm 74 and a third arm 76 of the control member 54 both extend generally away from the pivot point 64 in directions different from the first arm 66. The third arm 76 is coupled to a biasing member 78 for biasing the actuation assembly 52 to a released position, which will be described in greater detail below.

The flex member 58 is coupled to the control member 54 at the pivot 64. The pivot 64 is also the pivot point for the actuation assembly 52 as a whole, which pivots about a pivot axis B.

The flex member 58 includes a first arm 80 and a second arm 82, each extending generally away from the pivot 64 in substantially different directions. A biasing member 84 couples the first arm 80 of the flex member 58 to the second arm 74 of the control member 54 and biases the arms 80, 74 together such that the flex member 58 resiliently follows the control member 54 and the control member 54 resiliently follows the flex member 58 when one or the other pivots about the axis B. The biasing member 84 allows for resilience and some relative movement between the flex member 58 and the control member 54, e.g., in response to external stresses or accidental movement, as will be described in greater detail below. Thus, while the flex member 58 generally follows the pivoting movement of the control member 54 and vice versa, some relative pivoting movement is allowed between the flex member 58 and the control member 54 about the pivot 64. The biasing member 84 preferably includes a compression spring disposed between washers on a rod coupled between the first arm 80 and the second arm 74, as shown in FIGS. 2-3 and 11-12. In other constructions, other biasing members 84 may be employed, as discussed above. For example, as shown in FIGS. 4-10, an extension spring may be employed. A counter weight 86 coupled to a distal end of the first arm 80 of the flex member 58 provides redundancy to the biasing member 84 such that the control member 54 and the flex member 58 are biased to follow each other as described above. The counter weight 86 also biases the actuation assembly 52 to a retaining position, which will be described in greater detail below.

The retaining member 56 is pivotably coupled to a distal end of the second arm 82 of the flex member 58 at a pivot 88. The retaining member 56 includes an arcuate aperture 90 and a disengagement surface 91 for disengaging the clutch 18. A pin 92 fixed to the second arm 82 of the flex member 58 is received in the arcuate aperture 90. The retaining member 56 is pivotable about an angular range defined by the arcuate aperture 90 and is biased by a biasing member 94 towards the dog 26. The biasing member 94 includes a compression spring coupled between the retaining member 56 and the flex member 58; however, in other constructions, the biasing member 94 may comprise other forms as described above.

The clutch 18 is configured such that the external stop 60 is disposed proximate the stop roller 68 when the driving lug 30, and more specifically the contact surface 31, is disposed proximate the engagement member 40, and more specifically the roller 41, of the dog 26, e.g., an engagement location where the driving lug 30 would meet the roller 41. This positional relationship determines the angular distance (α). In other words, the angular distance (α) is the angular distance between the stop roller 68 and the driving lug 30 when the contact surface 31 is disposed proximate the roller 41. As illustrated (see FIGS. 4 and 10), the angle α is between about 90 and about 180 degrees, and more specifically is between about 130 and about 140 degrees, and more specifically is about 135 degrees. In other constructions, the angle α may be different but is determined by the relative locations of the stop roller 68 and the engagement member 40 as discussed above.

In operation, the trip linkage 50 holds the actuation assembly 52 in the retaining position against the bias of the biasing member 78 while the bale is being formed in the baler 10. The retaining member 56 is maintained against retaining portion 48 of the dog 26 and positions the dog 26 in the disengaged position against the force of the biasing member 42. The retaining member 56 resiliently engages the retaining portion 48 of the dog 26 due to the biasing member 94 and the give provided by the retaining member 56 being pivotably coupled to the flex arm 58. During engagement with the retaining portion 48, the retaining member 56 may be in a partially flexed state as the forces of the biasing members 42 and 94 act against each other. As the bale is being formed, the chain 24 is continuously operating such that the drive member 22 is continuously rotating. The driving lug 30 thus advances in a circular path of travel about the axis A in a counterclockwise direction. To the extent the dog 26 remains in the disengaged position (FIG. 4), driving lug 30 passes radially outward from the roller 41 of the dog 26 during each revolution and the clutch 18 remains disengaged.

Figure 5:
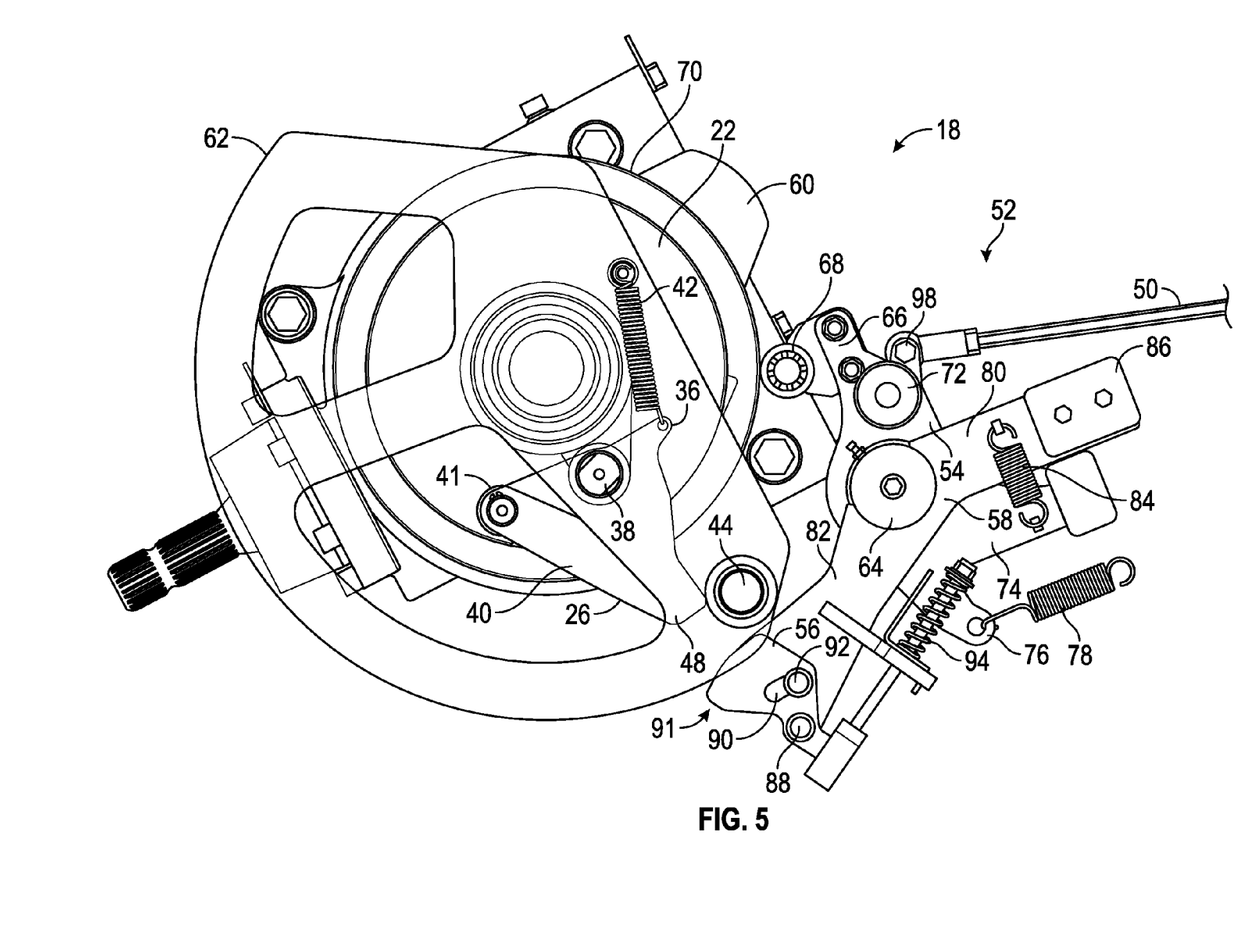
Figure 6:
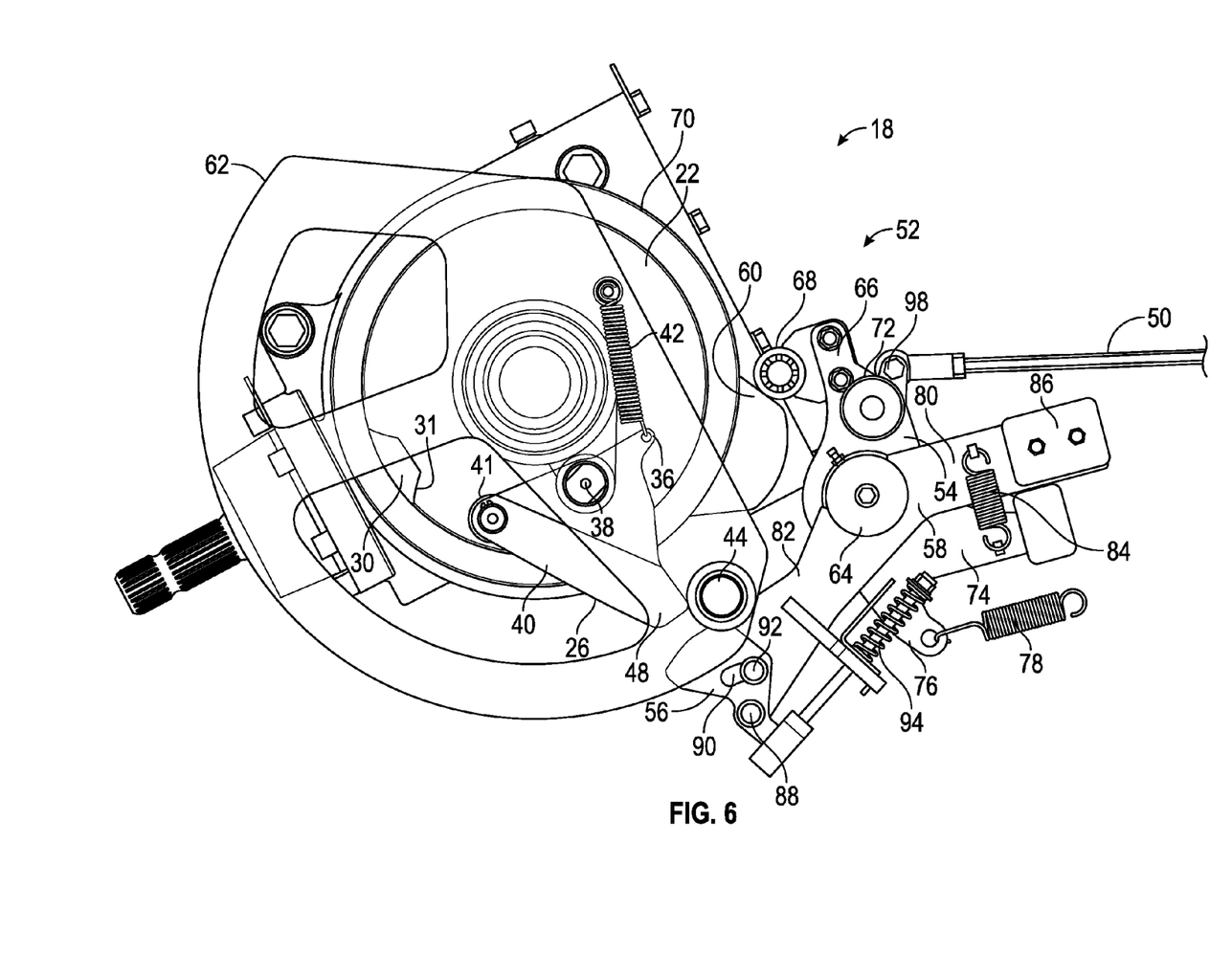

When the bale is formed, i.e., has reached a predetermined length as determined by the bale length sensor 16, the trip linkage 50 moves to release the actuation assembly 52 to the released position such that the biasing member 78 pulls the actuation assembly 52 about the pivot 64 in a counterclockwise direction. Due to this pivoting, the retaining member 56 separates from the dog 26, permitting the biasing member to inwardly pull the attachment point 36 such that the engagement member 40 (and the roller 41) of the dog 26 rotates about the pivot 38 towards the inner annular surface 34 of the drive member 22 (FIG. 5). As the retaining member 56 separates from the dog 26, the biasing member 94 forces the retaining member 56 to a fully extended position (counterclockwise). When the driving lug 30 contact surface 31 reaches the roller 41 (FIG. 7), the driving lug 30 drives the dog 26, which in turn drives the clutch member 28 through one operating cycle of 360 degrees to operate the aforementioned needles 14. During the operating cycle, the reset cam surface 62 engages the reset roller 72 (FIG. 10), which pivots the actuation assembly 52 clockwise about the pivot 64 to dispose the retaining member 56 back into the path of the retaining portion 48 of the dog 26 when the dog 26 returns at the end of its revolution. Re-engagement of the retaining member 56 with the retaining portion 48 rotates the dog 26 clockwise about the pivot 38 into its disengaged position, disengaging the clutch 18. The driving lug 30 continues along its path of travel.

In the event that the bale length sensor 16 attempts to release the actuation assembly 52 when the driving lug 30 is just about to pass under the dog 26 (e.g., near the engagement position as shown in FIG. 4), release of the actuation assembly 52 is inhibited by the external stop 60 to deter a poor connection between the driving lug 30 and the dog 26. As discussed above, the external stop 60 is disposed proximate the stop roller 68 by design in this condition. Specifically, in this position the external stop 60 engages the stop roller 68, thereby retaining the actuation assembly 52 in the retaining position regardless of activation of the trip linkage 50 and allowing the driving lug 30 to pass under the dog 26 without engagement. Once the external stop 60 clears the stop roller 68 (FIG. 5), the actuation assembly 52 is free to release as described above. That is, when the driving lug 30 makes another revolution and approaches the engagement member 40 of the dog 26 (FIG. 6), engagement will occur as described above if the trip linkage 50 has moved to release the actuation assembly 52.

Figure 7:
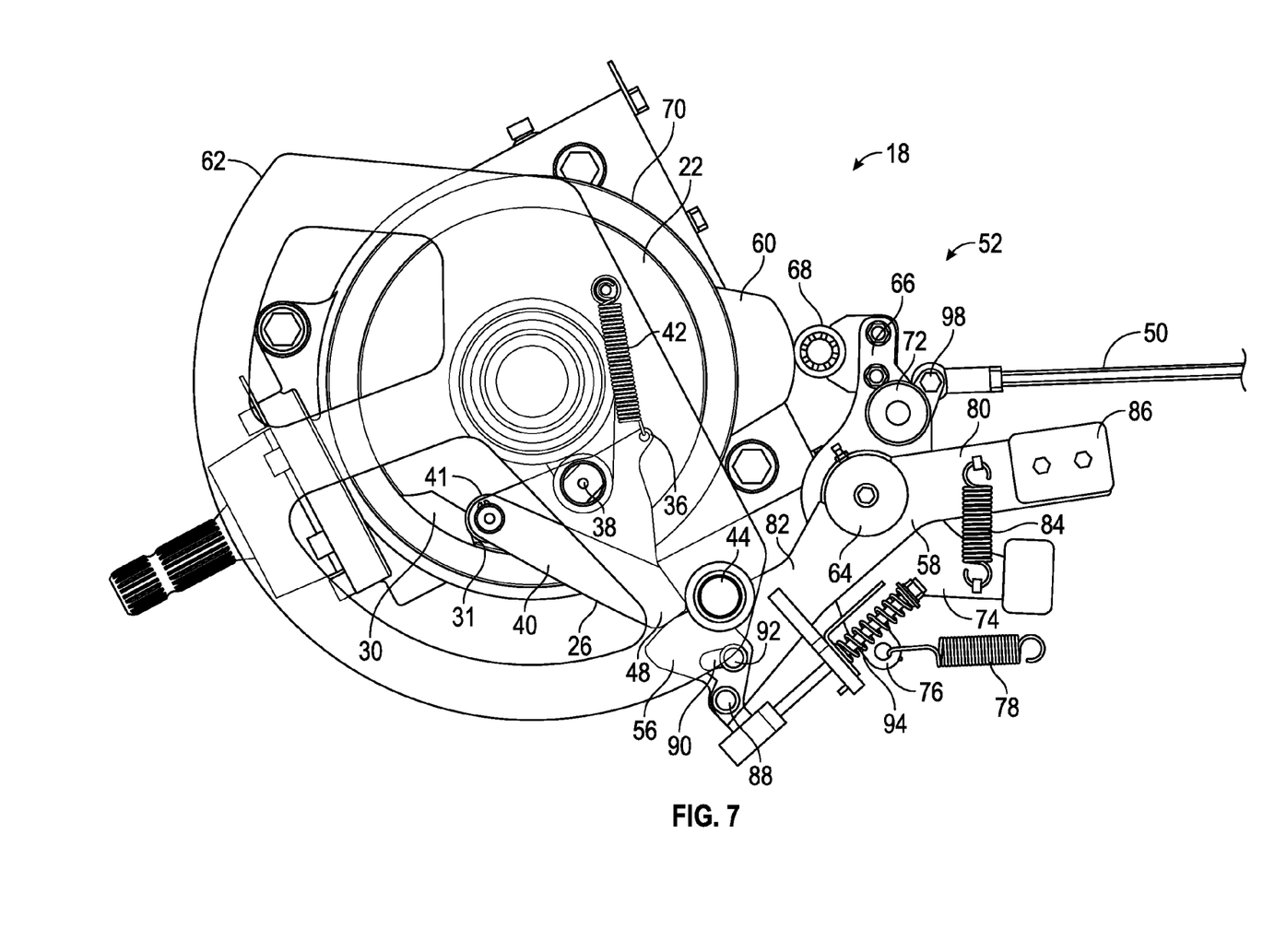
Figure 8:
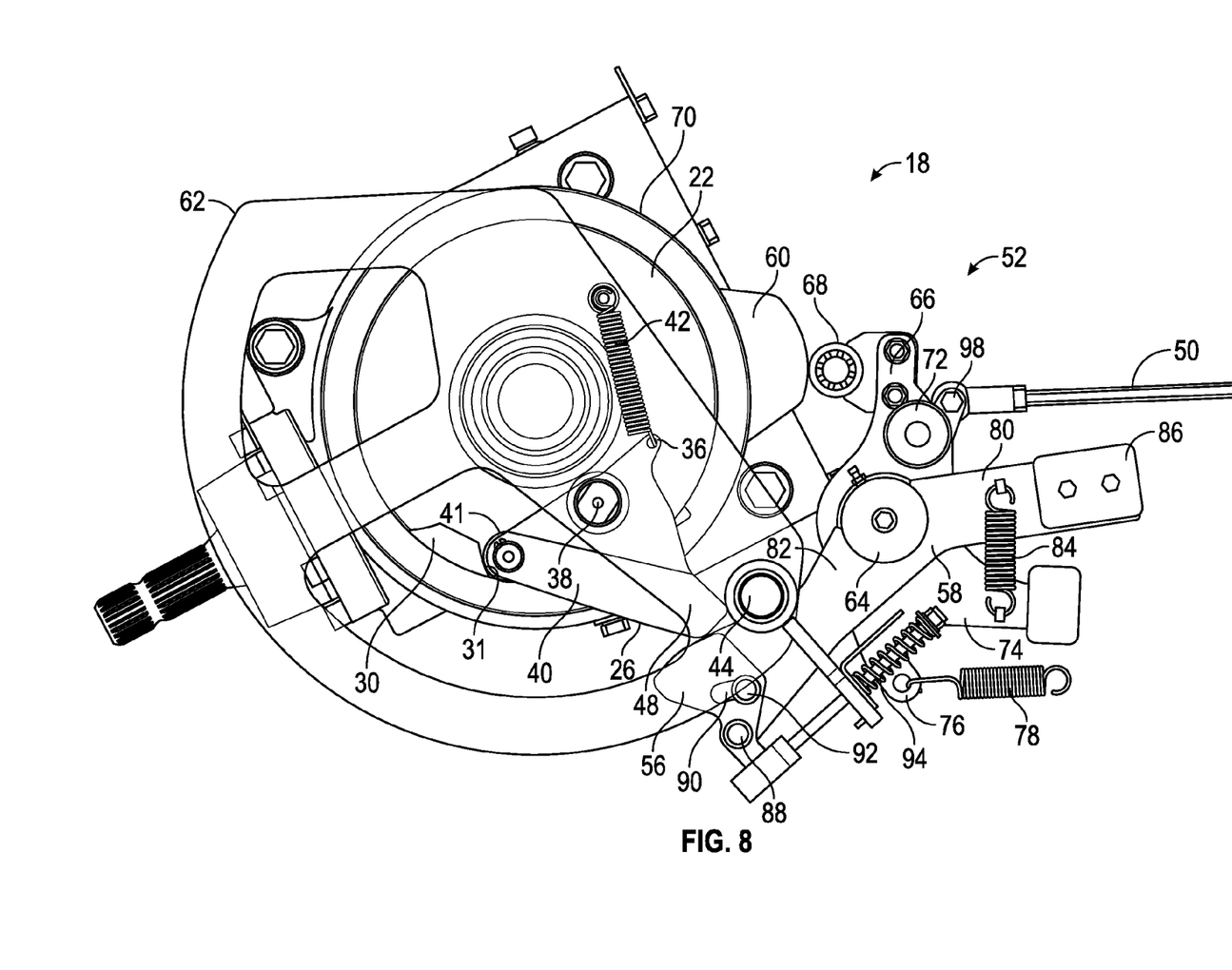
Figure 9:
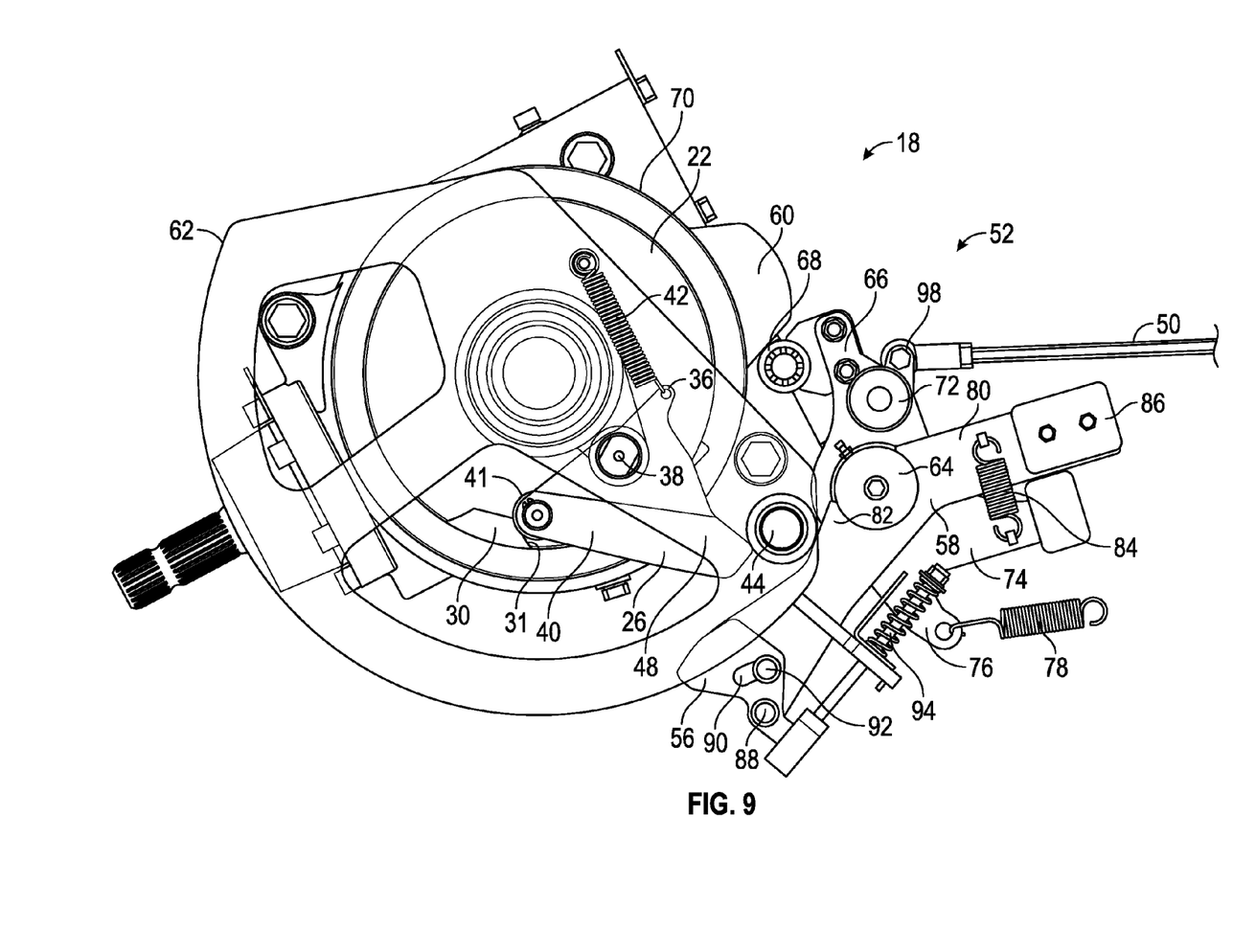

Typically, when the dog 26 becomes engaged with the driving lug 30, the retaining portion 48 clears the actuation assembly 52. However, in some instances, the retaining portion 48 may run into the actuation assembly 52. For example, when engagement between the stop roller 68 and the external stop 60 drives the control member 54 clockwise, the flex member 58 and the retaining member 56 are also driven clockwise, potentially driving the flex member 58 and/or the retaining member 56 into the engagement member 40 of the dog 26. Other possible reasons for interference between the dog 26 and the actuation assembly 52 include tolerance build-up, timing, vibrations, or other reasons. In any of these instances, to inhibit lock-up, binding, or damage to the components as the dog 26 is driven, the actuation assembly 52 flexes about the pivot 64 and/or the pivot 88 to make way for the dog 26 (FIGS. 7-8). Specifically, the flex member 58 pivots counterclockwise with respect to the control member 54, i.e., such that the first arm 80 of the flex member 58 moves away from the second arm 74 of the control member 54. The control member 54 may not be able to follow the flex member 58 in these instances due to engagement between the stop roller 68 and the external stop 60 inhibiting pivoting movement in that direction (counterclockwise). Thus, the flex member 58 allows the actuation assembly 52 to flex in on itself about the pivot 64 (FIGS. 7-8) to inhibit lock-up, binding, damage, etc. When the dog 26 is completely clear of the actuation assembly 52, then the biasing member 84 and/or the weights 86 allow the control member 54 and the flex member 58 to return to equilibrium to their relative angular positions with respect to each other, i.e., a neutral position (FIGS. 4-6 and 9-10). Furthermore, the retaining member 56 may also flex in these conditions. For example, the retaining member 56 may rotate clockwise about the pivot 88 with respect to the flex member 58 to make way for the driven dog 26, thereby inhibiting lock-up, binding, damage, etc.

Thus, the disclosure provides, among other things, an actuation assembly for engaging and disengaging a clutch, the actuation assembly being capable of flexing to avoid binding with other driven components. While the above describes example embodiments of the present disclosure, these descriptions should not be viewed in a limiting sense. Rather, there are several variations and modifications which may be made without departing from the scope of the present disclosure as defined in the appended claims.

What is claimed is:

1. A clutch for selectively driving a mechanism, the clutch comprising:
    a drive member configured to be rotatably driven about a drive axis;
    an engagement member movable between an engaged position cooperating with the drive member for driving the mechanism and a disengaged position; and
    an actuation assembly comprising
        a first member pivotably mounted about a pivot axis, wherein the pivot axis is fixed relative to the drive axis, the first member cooperative with a control element for movement about the pivot axis between a retaining position and a release position, and
        a second member pivotably mounted about the pivot axis and pivotable thereabout between the retaining position and the release position, the second member extending towards the engagement member in the retaining position for maintaining the engagement member in the disengaged position,
        wherein the second member is pivotable about the pivot axis independently of the first member such that the second member is rotatable relative to the first member.

2. The clutch of claim 1, further comprising a biasing member coupling the first member and the second member such that the first and second members resiliently follow each other in response to the control element.

3. The clutch of claim 2, wherein the biasing member comprises a spring.

4. The clutch of claim 2, further comprising a counter weight coupled to at least one of the first member and/or the second member for redundantly urging the first and second members to the retaining position.

5. The clutch of claim 1, further comprising a third member pivotably coupled to the second member, the third member having a surface configured to contact the engagement member.

6. The clutch of claim 5, further comprising a biasing member coupled between the second and third members such that the third member resiliently engages the engagement member to hold the engagement member in the disengaged position.

7. The clutch of claim 1, wherein the first member includes first and second arms generally extending from the pivot, the first arm being coupled to the control element at an attachment point, wherein the second member includes third and fourth arms, the third arm extending towards the engagement member in the retaining position, the clutch further comprising a biasing member resiliently coupling the second arm and the fourth arm such that the first and second members resiliently follow each other in response to the control element.

8. The clutch of claim 7, further comprising a counter weight disposed on the fourth arm for redundantly urging the first and second members to the retaining position.

9. A clutch for selectively driving a mechanism, the clutch having a drive member rotatably driven about a drive axis, a dog movable between an engaged position cooperating with the drive member for driving the mechanism and a disengaged position, and a control movable between a retaining position for holding the dog in the disengaged position and a release position for releasing the dog to the engaged position, the clutch comprising:
    an actuation assembly having a pivot fixed relative to the drive axis, the actuation assembly pivotable about the pivot between the retaining position and the release position in response to the control, the actuation assembly comprising
        a first member pivotable about the pivot between the retaining position and the release position, the first member coupled to the control for being moved between the retaining position and the release position; and
        a second member pivotable about the pivot between the retaining position and the release position, the second member extending towards the dog in the retaining position for holding the dog in the disengaged position,
        wherein the second member is coupled to the first member at the pivot such that the first and second members are independently pivotable about the pivot such that the actuation assembly is capable of flexing about the pivot to inhibit binding between the dog and the actuation assembly.

10. The clutch of claim 9, further comprising a biasing member resiliently coupling the first member and the second member such that the first and second members resiliently follow each other and are biased to return to a neutral position with respect to each other.

11. The clutch of claim 10, wherein the biasing member comprises a compression spring.

12. The clutch of claim 10, further comprising a counter weight coupled to at least one of the first member and/or the second member for redundantly urging the first and second members to the neutral position with respect to each other.

13. The clutch of claim 9, further comprising a third member pivotably coupled to the second member, the third member having a surface engaging the dog to hold the dog in the disengaged position.

14. The clutch of claim 13, further comprising a biasing member coupled between the second and third members such that the third member resiliently engages the dog to hold the dog in the disengaged position.

15. The clutch of claim 9, wherein the first member includes first and second arms generally extending from the pivot, the first arm being coupled to the control at an attachment point, wherein the second member includes third and fourth arms, the third arm extending towards the dog in the retaining position, the clutch further comprising a biasing member resiliently coupling the second arm and the fourth arm such that the first and second members resiliently follow each other and are biased to return to a neutral position with respect to each other.

16. An actuator for engaging and disengaging a clutch mechanism, the clutch mechanism including a drive member and a clutch engagement member for selectively engaging the drive member, the actuator comprising:
- a first member pivotably mounted about a pivot axis and responsive to a control element for pivotal movement about the pivot axis from a first position to a second position, the first member including at least one follower configured to engage a cam surface of the drive member; and
- a second member pivotably mounted about the pivot axis and resiliently couplable to the first member for concurrent pivotal movement with the first member about the pivot axis in response to the control element, the second member presenting a contact surface,
- wherein the second member is pivotable relative to the first member about the pivot axis in response to interaction between the contact surface and the clutch engagement member.

17. A clutch for selectively driving a mechanism, the clutch comprising:
- a driven rotating member having a driving lug positioned on an inner annular surface and having an outer surface;
- a dog movable between an engaged position wherein the dog is driven by the driving lug for driving the mechanism and a disengaged position wherein the dog is disengaged from the driving lug;
- an actuation assembly having a pivot and movable between a retaining position for holding the dog in the disengaged position and a release position for releasing the dog to the engaged position, the actuation assembly comprising
  - a first member pivotable about the pivot between the retaining position and the release position, the first member having a follower configured to selectively follow the outer surface of the rotating member,
  - a second member pivotable about the pivot between the retaining position and the release position, the second member extending towards the dog in the retaining position for holding the dog in the disengaged position, and
  - a biasing member resiliently coupling the first member and the second member such that the first and second members resiliently follow each other and are biased to return to a neutral position with respect to each other,
  - wherein the second member is coupled to the first member at the pivot such that the first and second members are independently pivotable about the pivot such that the actuation assembly is capable of flexing about the pivot to inhibit binding between the dog and the actuation assembly.

18. The clutch of claim 17, further comprising a stop disposed on an outer surface of the rotating member, wherein the follower is configured to follow the outer surface and the stop, wherein the first member rotates about the pivot as the follower follows the stop.

19. The clutch of claim 17, further comprising a counter weight coupled to at least one of the first member and/or the second member for redundantly urging the first and second members to the neutral position with respect to each other.

20. The clutch of claim 17, wherein the pivot is fixed within the clutch.

\* \* \* \* \*